United States Patent [19]

Readal et al.

[11] 4,135,006

[45] Jan. 16, 1979

[54] AUTOMATIC COATING WEIGHT CONTROLS FOR AUTOMATIC COATING PROCESSES

[75] Inventors: Gerald J. Readal, Pittsburgh; John R. Tiskus; William J. Tomcanin, both of Monroeville, all of Pa.

[73] Assignee: United States Steel Corporation, Pittsburgh, Pa.

[21] Appl. No.: 493,019

[22] Filed: Jul. 29, 1974

[51] Int. Cl.² .................................................. G01B 19/08
[52] U.S. Cl. .......................................... 427/10; 427/8; 427/9; 427/348; 118/8; 73/150 R
[58] Field of Search ............... 118/8; 117/201, 114 A, 117/102; 427/8, 9, 10, 348; 73/150 R

[56] References Cited

U.S. PATENT DOCUMENTS

| 3,709,192 | 1/1973 | Anderson et al. | 118/8 |
| 3,808,033 | 4/1974 | Mayhew | 117/114 A |
| 3,843,434 | 10/1974 | Heiks | 118/8 |
| 3,844,870 | 10/1974 | Donoghue | 118/8 |

FOREIGN PATENT DOCUMENTS 46-14521  4/1971  Japan ......................................... 427/10

*Primary Examiner*—Michael F. Esposito
*Attorney, Agent, or Firm*—Arthur J. Greif

[57] ABSTRACT

A digital computer is connected to various sensors and devices on a strip line, including a gauge located downstream of a coating bath for measuring coating thickness on the strip. The computer examines the coating weight data obtained from the measuring gauge and determines: (1) the average coating weight on each side of the strip; (2) the total average coating weight on both sides of the strip; (3) the coating weight at the conventional ASTM weigh-strip-weigh test locations on the strip; and (4) the minimum spot total coating on both sides of the strip. The computer then compares these data with target (set point) data entered by the operator and makes the following corrective adjustments: (1) a pressure correction factor is adjusted if either the total coating or the minimum spot coating does not meet required specifications; and (2) air knife position is adjusted if necessary to balance the coating from edge to edge and from side to side.

15 Claims, 7 Drawing Figures

AUTOMATIC COATING WEIGHT CONTROLS FOR AUTOMATIC COATING PROCESSES

BACKGROUND OF THE INVENTION

This invention relates to a method and apparatus for coating a substrate and, in particular, to a system for automatically controlling the average, minimum, and distribution of coating thickness of material produced in a continuous-coating process. The application discussed is a continuous-galvanizing line. However, the system can generally be applied to any continuous-coating process with actuators that control the coating thickness and a gauge that measures the coating thickness. The system provides a means of maintaining a given average coating weight over the width of the sheet while ensuring that a given minimum-coating weight over a spot less than the width of the sheet will also be met. The system also provides a means for periodic logging of process data such as these average- and minimum-coating weights.

In a typical coating operation of the type to which this invention is directed, the strip material, such as steel, tin, aluminum, etc., is moved from an entry station, which includes a weld machine for welding front ends of a new coiled strip to the rear end of a previous strip, through cleaning tanks, and then to a storage facility consisting of an entry loop section. The simplest type of entry loop consists basically of a single loop of the strip which falls into a loop pit which may typically be 50 feet deep. Alternatively, the storage loop may include sets of stationary rollers and corresponding sets of movable rollers mounted on a "loop car." The loop car is motor driven to allow the loop to be shortened or lengthened as appropriate. From the loop storage facility the strip may proceed through an annealing furnace to the coating bath, such as a molten zinc bath having a nominal temperature of about 900° F.

From the coating bath the coated strip travels upwardly in free travel a distance sufficient to cool the coating material. During this travel, the coated strip is moved past a pair of air knives located on each side of the moving strip. These air knives force air under pressure against the coated surface to adjust the coating thickness by forcing excess coating material downward toward the bath. The air stream is normally directed at a downward angle relative to the strip and the adjustment of this angle is generally made according to the operator's preference. The air knives are also capable of movement toward and away from the strip and the pressure of the air stream is also adjustable. It has been found that the system operates most effectively by maintaining equal pressures on both sides of the strip; therefore any adjustments to the knife pressure are made equally to both knives.

From the coating station, the strip travels to a measuring station which may be several hundred feet from the air knife location; this is the closest point to the coating bath that provides an environment in which the measuring apparatus can operate effectively.

Conventionally, coating weight measurements are made by taking test coupons from the strip and measuring the coating weight on each coupon. In compliance with ASTM (American Society for Testing and Materials) requirements, three coupons, or test slugs, are punched from the strip; the coupons are generally about 2½ inches in diameter and are taken from the center of the strip and from locations approximately 2 inches in from each edge. The slugs are weighed, then the zinc coating removed by an acid bath treatment, and the stripped slugs again weighed in order to determine the coating weight on the strip.

Two ASTM requirements must generally be met: (1) the average coating weight for all of the coupons must be not less than a fist minimum average total coating weight; and (2) the coating weight for each coupon must be not less than a second minimum average coating weight. For the ASTM G-90 specification, for example, the minimum average total coating weight is 0.90 oz/ft$^2$ and each coupon must have a coating weight of at least 0.80 oz/ft$^2$. In addition, in some cases, at least a prescribed percentage of the total coating must be on each side of the test coupons. However, because of inherent system limitations, it is almost impossible to obtain an exactly uniform coating across the width of the strip from one edge to the other. In general, the edge coating thickness will be less than the specified minimum average total weight and coating thickness increases toward the center of the strip.

The principal object of the present invention is to provide an automatic control over the coating operation so as to minimize the amount of coated strip material rejected either by line inspectors or by the customer due to insufficient coating weight or improper coating distribution. Moreover, this automatic control operation must be performed on a strip moving at a rate of anywhere from 200 to 1200 or more feet per minute; in the particular line for which this invention was initially developed, the strip moves at a rate of about 600 feet per minute.

SUMMARY OF THE INVENTION

In accordance with the present invention a digital computer is connected to various sensors and devices on a strip line including a gauge for measuring the thickness of the coating. Typically, the computer may be a Westinghouse model P2500 digital process-control computer, and the gauge may be a Nucleonic Data Systems Model 200 zinc-coating gauge. This zinc-coating gauge uses X-ray type emissions from a radioactive isotope (Americium 241) to measure the zinc thickness on the galvanized product. Two gauge heads (top and bottom) give independent measurements of the coating on each side of the strip. The gauge heads are mounted approximately 230 feet (70 m) downstream from the air knives on the first down pass of the cooling tower.

When controlling, the computer causes the gauge heads to continuously traverse back and forth across the width of the moving galvanized strip. During each forward traverse (operator's side to drive side of the line), the gauge heads transmit coating-weight signals to the computer. During the return traverse of the gauge heads, the computer examines the coating-weight data accumulated during the forward traverse, and determines:

1. the average coating weight on each side of the strip;
2. the total (both sides) average coating weight on the strip;
3. the coating weight at the conventional weigh-strip-weigh test locations (edge-center-edge) on the strip, as specified, for example, by ASTM Designation A525-65T; and
4. The minimum spot total (both sides) coating (covering, for example, 2½ inches or 63½ mm of width) on the strip.

The computer then compares these data with target (set point) specifications entered by the operator and makes the following corrective adjustments:

1. a pressure correction factor ($\Delta K$) is adjusted if either the total coating or the minimum spot does not meet specifications (the significance of $\Delta K$ will be explained later); and 2. the air-knife position (knife-to-strip distance) is adjusted if necessary to balance the coating from edge to edge and from side to side. This process is repeated after each gauge traverse.

DESCRIPTION OF THE PREFERRED EMBODIMENT

Figure 1:
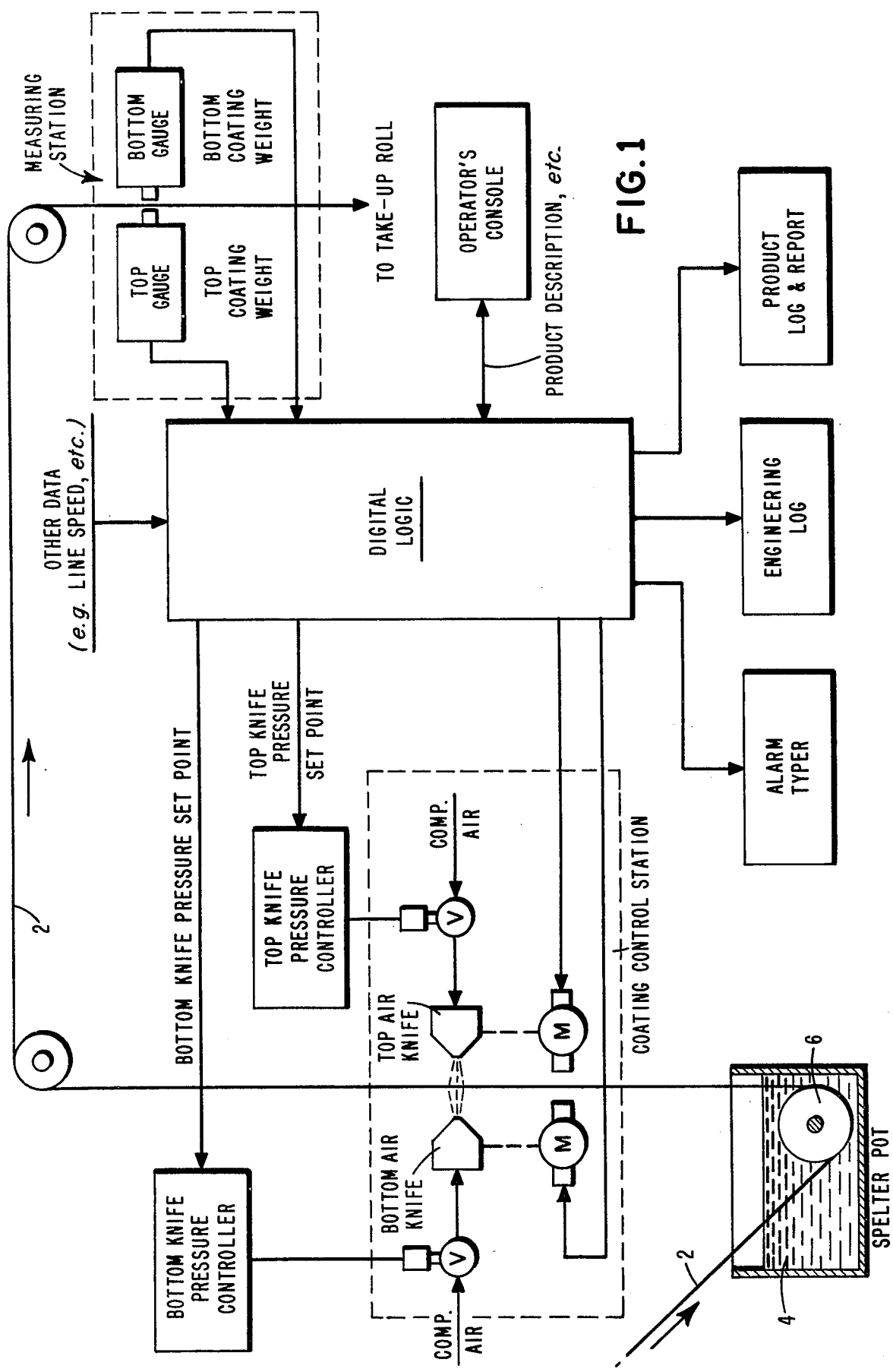
FIG. 1 is a schematic representation of the coating control system.

The basic system of this invention is shown in block diagram form in FIG. 1. A strip 2, having exited from an annealing furnace or other pre-coating treatment (not shown) travels downward into a coating bath 4 containing, for example, molten zinc or aluminum at a temperature on the order of 900° F. The strip 2 travels around a roller 6 located in the bath and begins a substantially vertical upward swing to a direction changing roller 8. A vertical path is used at this point to permit the coated strip exiting from the bath to travel unsupported for a distance sufficient to cool the coating on the strip and to permit excess coating removed from the strip to flow back into the bath.

Located just above the coating bath 4 on either side of the moving strip are a set of fluid nozzles 10, 12 which jet fluid under pressure against the coated strip to remove excess coating from the strip and thereby accomplish weight and distribution control over the applied coating. Although any appropriate fluid may be used, these devices are commonly referred to as "air knives" and are described in detail in U.S. Pat. Nos. 3,406,656, 3,459,587, and 3,670,695, for example; the portions of these patent disclosures relevant to details of the construction of the air knives are incorporated herein by reference.

The air knives direct a jet of air against the strip as it leaves the galvanizing bath which, in turn, meters the amount of molten zinc on the strip, thus regulating the coating weight. The air knives are physically located above the galvanizing bath and on opposite sides of the strip. The height of the knives above the galvanizing bath and the distance of each knife from the strip can be adjusted independently. This is accomplished by a set of eight drive motors, two motors for each end of each knife. One motor adjusts the height of the knife end above the galvanizing bath (i.e., raises or lowers the end), and one motor adjusts the horizontal distance from the end of the knife to the strip (i.e., moves the end toward or away from the strip). Each end of each knife can be adjusted independently of the other thus permitting the knives to be skewed or twisted to assume a desirable position with respect to the strip. The position of the air knives relative to the strip determines the amount of zinc removed at a given air pressure and line operating condition (more zinc is removed as the knives are moved closer toward the strip.) Adjusting the skew or distances between the strip and the air knives provides a means of controlling the distribution of coating weight across the strip. Good coating weight control requires both air-knife pressure control and position control. Pressure changes are used to control the coating weight level and position changes are used to control the coating weight distribution across the strip and from side to side (top to bottom) of the strip. The system of this invention involves control of both air-knife pressure and air-knife position to control the continuous-galvanizing-coating process.

After passing the coating control station, the coated strip moves through a measuring station, consisting of a pair of scanning gauges 14, 16 located on either side of the strip. The gauges measure the amount of coating on each side of the strip and generate signals representative of the measured coating weights, which signals are then utilized in a manner to be described below to adjust the pressure and position of the air knives.

After leaving the measuring station, the coated strip moves to an exit station where it is taken up and coiled or cut into sheets in a known manner.

The preferred embodiment of this invention utilizes an X-ray fluorescence on-line coating-weight gauge of the type manufactured by Nucleonic Data Systems, Inc. and designated Model 200. The gauge and its operation are described in Nucleonic Data Systems Descriptive Bulletin DB-200. The Model 200 coating-weight gauge utilizes an isotopic X-ray fluorescence technique to measure coating thickness of various materials on steel to provide a non-destructive, non-contact analysis of the coating thickness. The system consists of a measuring head mounted on each side of the strip for measuring coating weight, a head traversing system, traversing drive logic and coating weight measuring electronics together with operator control and readout console. The particular model used in this invention includes an electronic interface for transmission of measurement and status information to other equipment such as a digital computer or similar devices and to enable such external devices to control the operation of the gage measuring heads.

The measuring head emits X-ray energizing radiation and detects the resultant X-ray fluorescence. The signals are analyzed by the measuring electronics which select the desired signals to be analyzed and count the rate of occurrence of these signals. By selecting the proper X-ray signal, depending on the type of coating material being used, the count-rate is known to be related to the coating material thickness. Thus, the electronic circuitry can generate an output signal that is directly related to the coating thickness. By processing the digital count-rate information, a digital and analogue readout displaying coating thickness in ounces per square foot is achieved.

The operating mode of the gauge is selected by the line operating personnel or by digital computer logic. The measuring head can be held in standby position off the rollers, automatically scan the width of the strip, automatically sample three preset positions on the strip, or can be manually positioned anywhere on the strip. In an alternative mode, which is utilized in this invention, the entire operation is controlled by digital computer logic (or hard-wired digital logic) with minimum use of electromechanical parts susceptible to wear and tear. Coating-weight data are collected from the X-ray coating-weight gauge on a periodic basis (typically 0.5 second) as it scans the strip. In a typical application, the gauge scans the strip at the rate of one inch per second while in the data gathering mode, and retracts at the rate of four inches per second after having reached the far edge of the strip. This process of scanning and retracting is done automatically by the gauge hardware under command of the digital computer. During the time when the gauge is scanning the strip for data, the gauge moves a fixed distance (approximately 0.5") between sampling times; two pieces of coating information are sent by the guage to a digital computer each ½ second. This information consists of the top and the bottom coating weights as "seen" by the gauge heads during the previous ½ second of gauge head travel.

The measuring station output, consisting of signals representing the measured coating weights, is applied to logic circuits, either in the form of hard-wired circuits or a digital computer, which operate on the measuring station data to provide signals for controlling the air knife pressure and position relative to the moving strip. Portions of the following description will refer to hard-wired logic circuits shown in block diagram form and others to flow chart diagrams representing programmable instructions to a digital computer. In the present invention, a Westinghouse P2500 Process-Control Computer is employed although other digital computers are also suitable. The P2500 computer is described in Westinghouse bulletins EB-23-301, May 1971; B-135, January 1971; B-144, October 1971; B-132, revision 1, March 1971; and SA-126, October 1971. Although certain portions of the disclosure refer to hard-wired logic and others to flow charts, it is readily apparent that one can be derived from the other or vice versa.

The control logic of this invention controls two aspects of the air knives: the air pressure and the knife position relative to the strip. Pressure changes are used to control the coating-weight level, and position changes are used to control the coating-weight distribution. The necessary pressure is determined from a mathematical model which relates air pressure to coating-weight set point, air knife geometry, and strip line speed. The equation representing the coating weight-pressure model used is:

$$P = (K_o + \Delta K)[V^n/\overline{C}_D]$$

where:
$K_o$ = position factor.
$\Delta K$ = pressure correction factor.
$V$ = strip speed.
$n$ = an exponent (typically 1.4) which is constant for a given galvanizing line.
$C_D$ = average coating weight set point.

Figure 2:
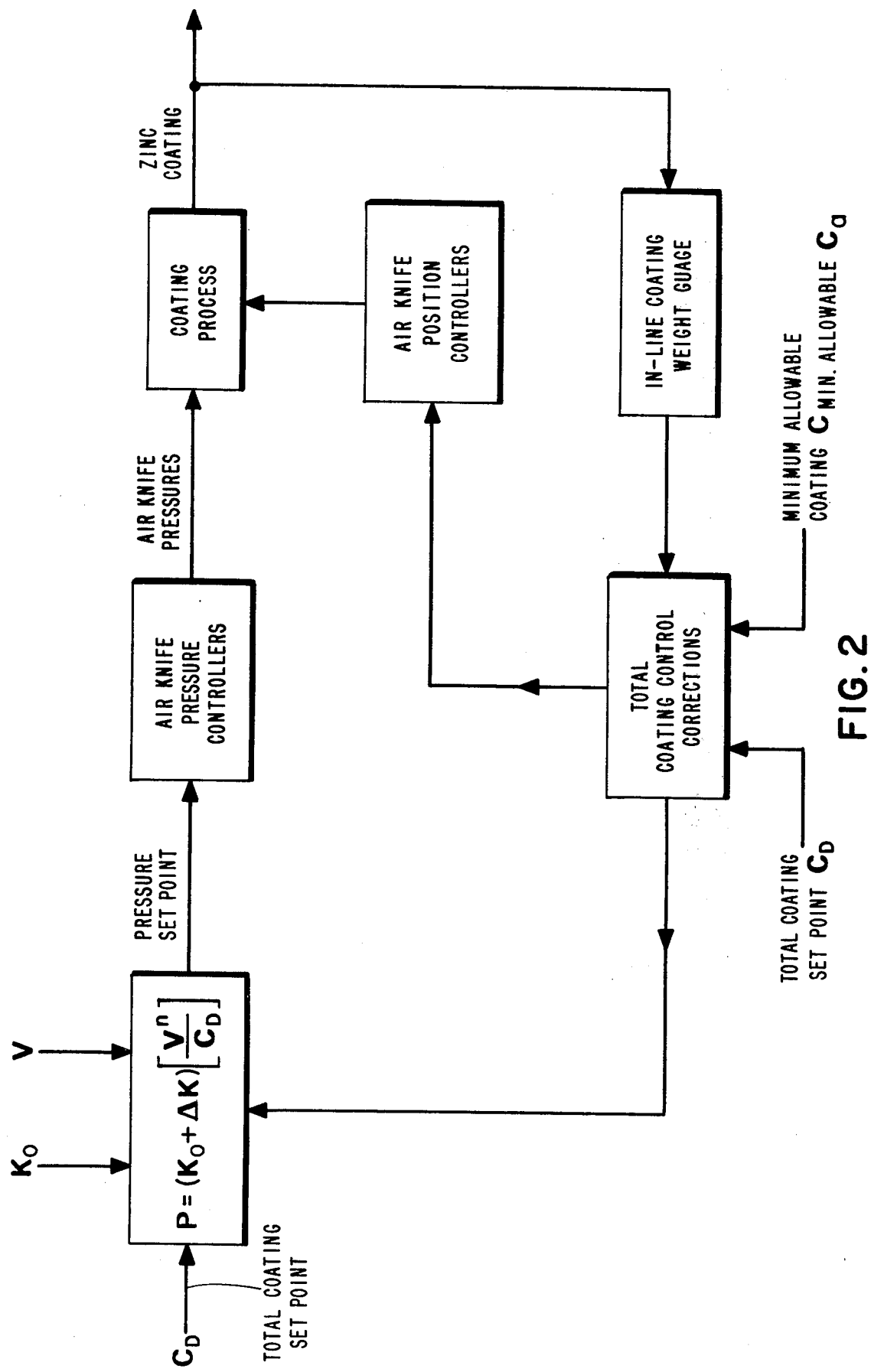
FIG. 2 is a block diagram representation of the principal features of the control system.

A block diagram of the air knife pressure control system is shown in FIG. 2. The average coating set point $C_D$ and the minimum spot coating set point $C_a$ are entered into the logic circuit by the operator; typically this is accomplished by manually setting the appropriate set point values into the computer from thumbwheel switches or similar devices on an operator console or by means of data cards contaning a product code. The position factor $K_o$ is preferably set at a nominal value, based on previous experience, depending on the horizontal, vertical, and angular positions of the air knives when control is initiated. Although $K_o$ can be determined experimentally, typically, the operator will set the air knife pressure at an initial value; since the average coating set point $C_D$, the strip line speed V, and the operator-set pressure, P are known, an initial value of $K_o$ can be calculated using the mathematical model given above. A typical value of $K_o$ would be 0.000750. Initially $\Delta K$ equals zero.

The initially preset and subsequently calculated air knife pressure set point P controls air knife pressure controllers to adjust the pressure output of the air knives. These pressure controllers can be in the form of electro-pneumatically operated valves which adjust the air pressure flowing through the valves in proportion to an applied electrical signal. A typical air supply and control system is shown in U.S. Pat. No. 3,494,324 to Bauer et.al. This patent discloses a system for controlling air pressure as a function of the strip line speed. Air pressure to the knives is controlled by a butterfly valve which may be modified so as to be controlled by the pressure set point signal P to adjust the air knife pressure as a function of the control system of this invention.

As the coated strip moves down the line, it passes through the measuring station containing the scanning X-ray gauges. In the normal automatic operating mode, the gauge (which includes source and detecting heads on both sides of the strip) traverses the width of the strip which may typically be 62", at a speed of about 1 inch per second in the data gathering mode with sampling information being obtained and sent to the computer each ½ second. This information consists of top and bottom coating weights for each sampled position.

In terms of hard-wired components, the sampled coating weight data is entered into two shift registers, each shift register containing at least as many storage blocks or cells as there are possible sampling positions, i.e., maximum possible strip width in inches divided by ½. Thus for a maximum 62" wide strip there would be at least 124 sampling positions. Because the measuring station is located a considerable distance from the coating station (in the present system this distance is 230 feet), two additional pieces of information must be stored in corresponding additional shift registers at the same time that the sampled coating weight information is being fed to the first two shift registers; these are the coating weight set points and the pressure corrections factor for that portion of the coated strip being measured. A suitable tracking system must be used to record and track such information as the coating-weight set points and pressure correction factor from the air knives to the coating gauge to compensate for the dead time between any change in operating conditions at the air knives and the detection by the coating gauge of this change. Such a tracking system is described and claimed in the present inventors' application entitled "Process Data Tracking System," Ser. No. 492,960 filed concurrently with this application.

For the sake of simplicity and ease of understanding, this invention will be first described using the assumption that there is no delay between the coating and measuring stations; later, the modifications required by the delay which occurs in practice will be discussed.

Figure 3:
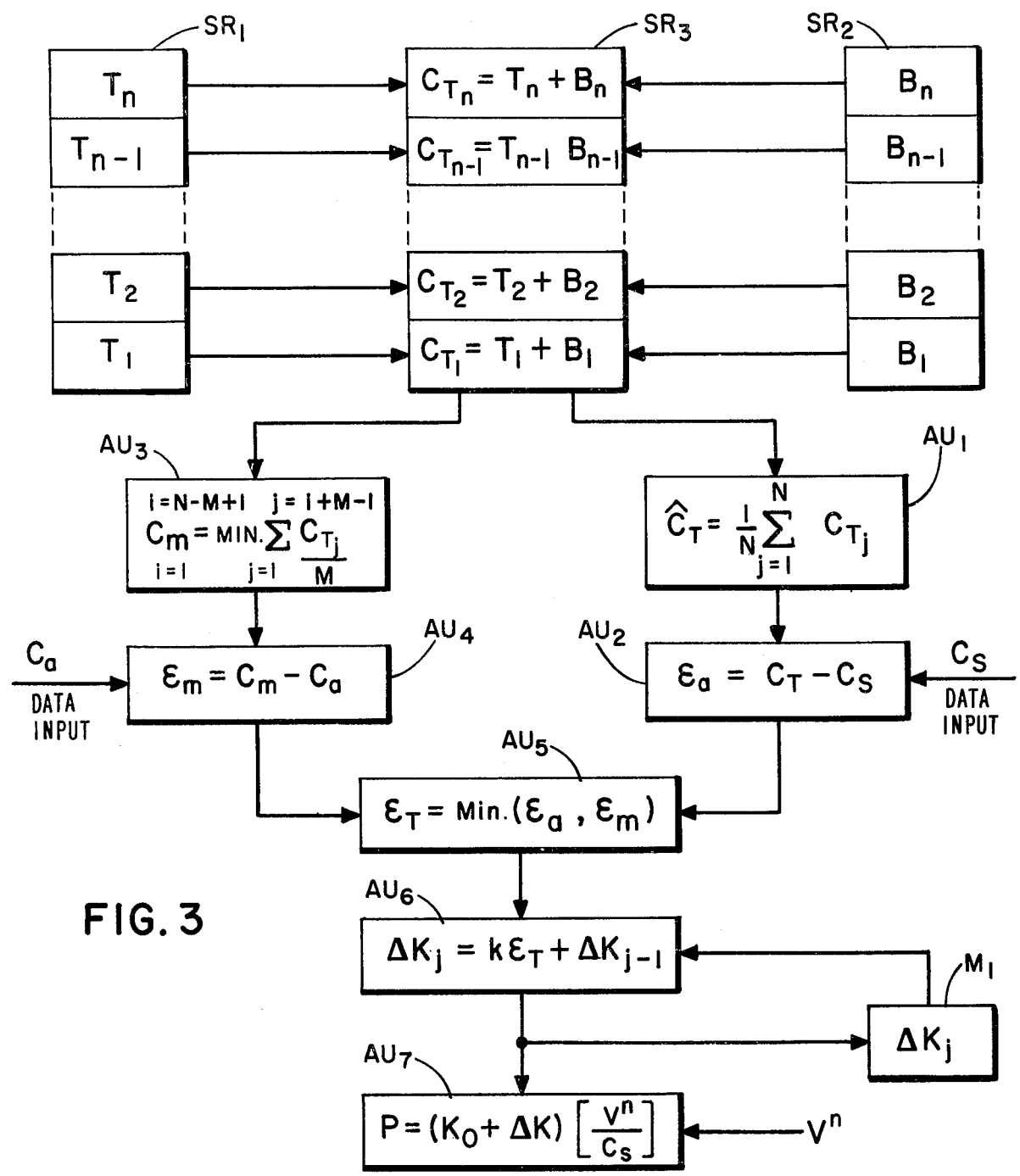
FIG. 3 is a block diagram of the pressure control circuit.

As noted above, during the scanning traverse of the measuring gauge, the information corresponding to coating weight measured at each sampled position across the strip is stored in a storage device, such as a shift register. As shown in FIG. 3, the measured top and bottom coating weights $T_j$ and $B_j$, respectively, are stored in separate registers $SR_1$ and $SR_2$. Upon completion of the data gathering scan, the measuring head performs a non-scanning retrace across the strip at a higher rate than the scanning trace; in practice, the retrace rate is approximately 4 inches per second. All calculating and control adjustments are made during this retrace period. The only operations performed during the scanning trace are the collecting and storing of coating-weight data in the shift registers $SR_1$ and $SR_2$ and the adjustment of the air knife pressure as a function of the strip line speed and coating set point changes. However, if desired, the system could be modified to also calculate and control during the trace period and to also collect data during the retrace period.

Figure 5:
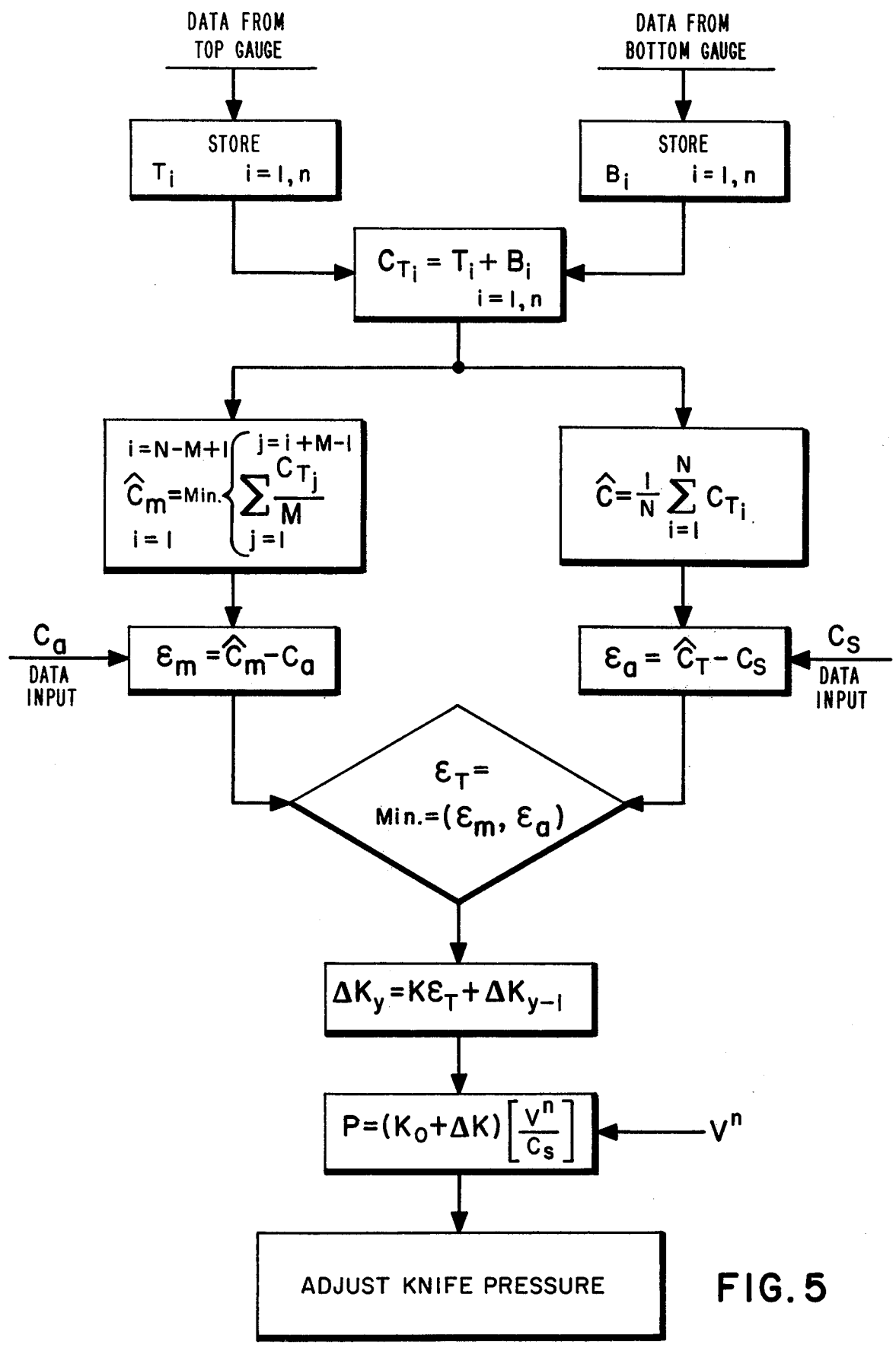
FIG. 5 is a flow chart of the pressure control operations performed by the digital computer.

Control of the air knife pressure is based on the difference between the measured coating-weight data and coating-weight set point data representing the average coating weight and the minimum spot coating weight. The pressure control operation can be accomplished either by suitably programming the P2500, or similar, computer or with a hard-wired logic circuit as shown schematically in FIG. 3. A corresponding flow chart, from which the programmer could develop the appropriate instructions for the P2500 computer, is shown in FIG. 5.

Referring to the hard-wired logic of FIG. 3, the measured top and bottom coating weights for each scanned position are added together and stored in a third shift register $SR_3$; register $SR_3$ should contain at least as many storage blocks or cells as shift registers $SR_1$ and $SR_2$. Register $SR_3$ now contains the total coating weight for each scanned position on the strip. These weights are then averaged in averaging circuit $AU_1$ (AU designates well known arithmetic units available commercially as modular units from various manufacturers.) The output of circuit $AU_1$ is a signal $\hat{C}_T$ representing the average measured weight of the coating on both sides of the strip. This signal is applied to one input of arithmetic unit $AU_2$ and the selected average coating weight set point $C_D$ (which is a standard value forming part of the product code designation and is typically based on ASTM requirements) is applied to a second input of circuit $AU_2$. This unit calculates the difference between the average total coating weight $\hat{C}_T$ and the average coating set point $C_D$ to produce error signal $\epsilon_a$.

Another circuit, designated $AU_3$, calculates the minimum measured spot coating weight. This is done by averaging successive groups of measured incremental total coating weights stored in $SR_3$ and then selecting the lowest calculated group average. If the storage cells of register $SR_3$ are designated $C_{T_1}, C_{T_2}, \ldots, C_{T_n}$, and the number of values averaged in each group corresponds, for example, to M = 5, to the reflect coating over an area equivalent to the conventional ASTM weigh-strip-weigh (WSW) test coupon, then circuit $AU_3$ will calculate the average of successive groups consisting of cells $C_{T_1}$ to $C_{T_5}$, $C_{T_2}$ to $C_{T_6}$, $C_{T_3}$ to $C_{T_7}$, ..., $C_{T_{n-4}}$ to $C_{T_n}$ and the output of $AU_3$ will consist of a signal $C_m$ representing the smallest of these averaged values.

Figure 3A:
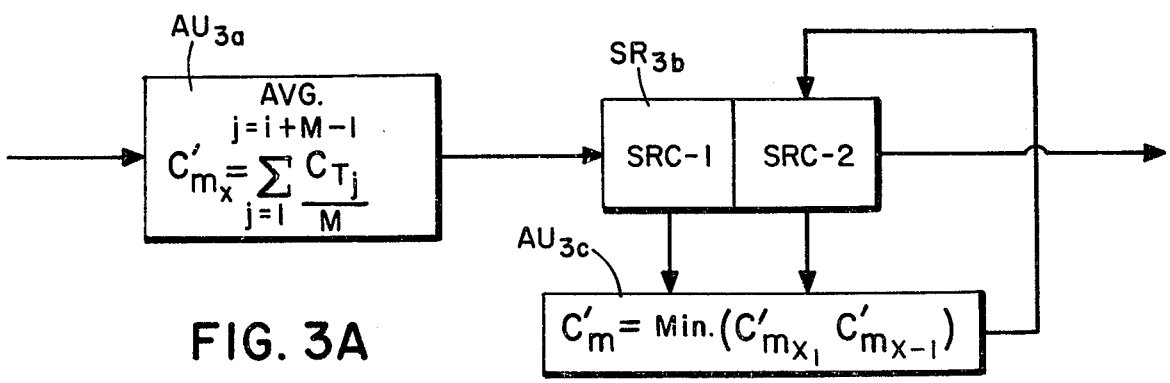
FIG. 3a is a block diagram of the minimum spot coating circuit.

A relatively simple circuit for accomplishing the minimum spot selection is shown in FIG. 3A and it includes an averaging circuit $AU_{3a}$ connected to register $SR_{3b}$ through appropriate switching circuits to accomplish the sequential group of M averaging; the output of averaging circuit $AU_{3a}$ is applied to a 2-cell shift register $SR_{3b}$, which may be of the destructive read-out type. Register cell SRC-1 stores the most recent spot coating weight value calculated by $AU_{3a}$ and cell SRC-2 stores the previous calculated spot coating weight. The shift register cells are connected to a comparator circuit $AU_{3c}$ which compares the spot coating weights stored in the register $SR_{3b}$ and stores the smaller of the two compared values in cell SRC-2. The next succeeding calculated spot coating weight is then supplied to cell SRC-1 for subsequent comparison with the value stored in cell SRC-2. This operation continues until each group of M cells of register $SR_3$ have been averaged and compared and the last calculated minimum spot coating weight value has been stored in cell SRC-2.

The calculated minimum spot coating weight $C_m$ is then applied to one input of circuit $AU_4$; the minimum spot coating weight set point value $C_a$ is applied to a second input of circuit $AU_4$ which then calculates the difference of these two values to provide an error signal $\epsilon_m$. The predetermined minimum spot set point $C_a$, like set point $C_D$, is a known function of the product code and typically related to ASTM standards.

Both error signals $\epsilon_a$ and $\epsilon_m$ are applied to respective inputs of comparator circuit $AU_5$ which selects the more negative of the error signals $\epsilon_a$ and $\epsilon_m$ for use in further computations. The selected error signal becomes the absolute system error $\epsilon_T$.

The output $\epsilon_T$ of circuit $AU_5$ is fed to an input of circuit $AU_6$ which calculates the pressure correction factor according to the equation:

$$\Delta K_p = k\epsilon_T + \Delta K_{p-1}$$

where:
k is a gain factor which determines the dynamic response of the control system,
$\Delta K_o = 0$
$\Delta K_p$ is the pressure correction factor for the pth scan, and
$\Delta K_{p-1}$ is the pressure correction factor for the immediately preceding scan of the measuring heads.

Figure 4:
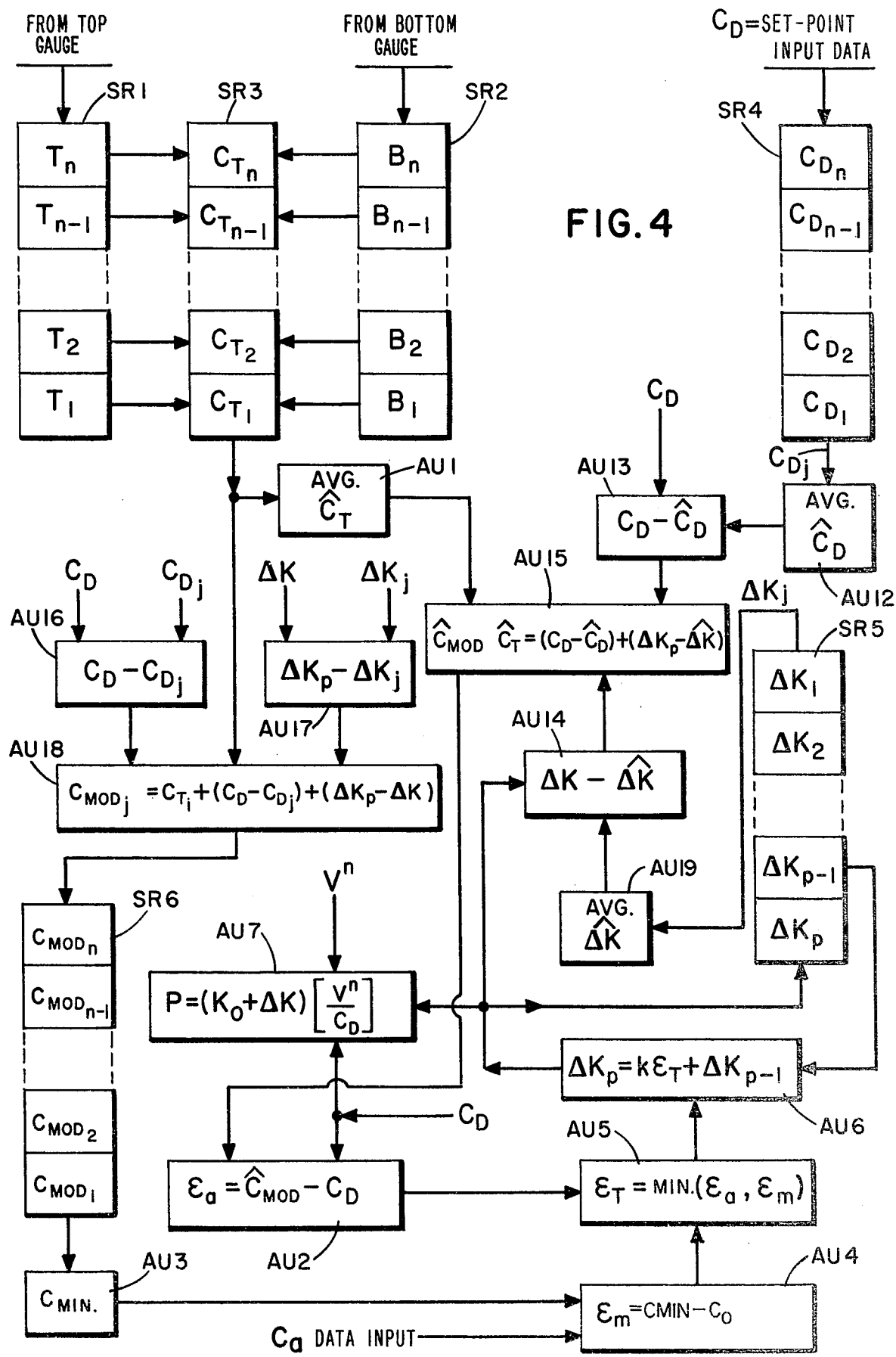
FIG. 4 is a block diagram of the modified pressure control circuit.

The latest value of $\Delta K$ calculated in circuit $AU_6$ is applied to calculating circuit $AU_7$ and to a single cell memory $M_1$ where it is stored until the next correction is to be calculated. Memory cell $M_1$ may be part of a larger register $SR_5$ as shown in FIG. 4. Circuit $AU_7$ calculates the pressure control signal P which is applied, as discussed above, to control the fluid pressure of the air knives. The net effect of this process is an integral-type controller, having a gain, k. The computer then adjusts the air-knife pressure, if necessary, in accordance with the mathematical model given above to maintain the desired average coating weight, or to raise the coating-weight average above the set point, if necessary, to maintain the required minimum spot coating.

FIG. 4 shows a modified form of the pressure control logic circuit of FIG. 3. The circuit of FIG. 4 takes into account the delay factor resulting from the distance between the air knives and the measuring gauge. The circuit elements of FIG. 4 which correspond to those described above relative to FIG. 3 are identified with the same reference designations as the corresponding elements of FIG. 3.

During the time that it takes a given point of the coated strip to move from the air knives to the measuring gauge the operator may have modified the coating set points $C_D$ and $C_a$ due to a change in customer order specifications. A shift register $SR_4$, having the same number of storage locations as registers $SR_1-SR_3$, is provided to store the average coating weight set point data $C_{D_j}$ for each scan increment. The $C_{D_j}$ values are made available for storage in $SR_4$ as described in the present inventors' companion application mentioned earlier. The incremental set point data is averaged in averaging circuit $AU_{12}$. The output of circuit $AU_{12}$ is applied, along with the current set point $C_D$ to circuit $AU_{13}$ to obtain the difference between the current set point $C_D$ and the calculated average set point.

The current set point is the latest set point value set into the computer by the operator and may be different from the set point set into the computer at the time the strip position being measured was passing through the coating station.

A further shift register $SR_5$ is provided to store previous pressure correction factor data for subsequent use. Like the $C_{D_j}$ data described above, previous pressure correction factor data ($\Delta K$) is made available for storage in $SR_5$ by the tracking system of the present inventors' companion application. Only one adjustment of the pressure correction factor is made during a scan period; however, as the measuring gauge traverses the strip, the strip is also continuously moving past the gauge; thus, an adjustment corresponding to point j on the strip being measured may be different from the adjustment made when points $j-1$ or $j+1$ were passing through the coating station. The stored incremental pressure correction factors are then averaged in averaging circuit $AU_{19}$ and the difference between the latest correction and the averaged corrections is determined in circuit $AU_{14}$. This averaging represents a very simple technique for compensating differing pressure correction factors within a scan. More sophisticated techniques are, of course, possible.

The outputs of each of circuits $AU_1$, $AU_{13}$, and $AU_{14}$ are applied to adding circuit $AU_{15}$ to obtain a modified measured average coating weight $C_{MOD}$. This modified measured average coating weight is applied, along with the current average coating set point $C_D$, to error determining circuit $AU_2$ to determine the error $\epsilon_a$ between the measured average coating weight and the current average coating set point.

Modified incremental total coating weights $C_{MODj}$ are also calculated as follows. The difference between the current minimum spot set point and the stored minimum spot set point $C_{D_j}$ corresponding to the strip location j is calculated in circuit $AU_{16}$; similarly, the difference between the latest pressure correction factor $\Delta K_p$ and the pressure correction factor $\Delta K_j$ corresponding to the strip location j is calculated in circuit $AU_{17}$. The outputs of circuit $AU_{16}$ and $AU_{17}$, along with the incremental total coating weight $C_{T_j}$, are added in circuit $AU_{18}$ and the results stored in shift register $SR_6$. This shift register $SR_6$ will then contain the modified incremental measured total coating weights $C_{MOD1}, \ldots, C_{MODn}$.

The measured minimum spot coating weight is calculated, as described above with respect to FIG. 3, in circuit $AU_3$ utilizing the values stored in $SR_6$ instead of those stored in $SR_3$ and the error between the modified measured minimum spot coating weight $C_m{}^{40}$ and minimum spot coating set point $C_a$ is calculated in circuit $AU_4$. The system error $\epsilon_T$ is then determined in circuit $AU_5$ and the pressure correction factor determined in circuit $AU_6$, as described above.

The second type of control function performed by this system relates to the control of the position of the air knives relative to the coated strip. Specifically, the ends of the air knives are made adjustable to provide a means for controlling the distribution of coating weight on the strip. Thus, by moving one or more of the knife ends, either toward or away from the strip or in the direction of travel of the strip, the air jet slot can be skewed in two directions. The movements of the knives themselves are controlled by AC motors, two for each knife end, to move that end toward and away from the strip or up and down in a plane more or less parallel to the plane of the strip. Typically, the motors are relay operated and a motor will be energized, by closing the relay upon receipt of an appropriate signal from the logic circuit, for a preset period, for example, on the order of ½ to 1 second. A ½ second motor operation will result in a knife end movement of about 1/32", sufficient to produce a measurable change in the coating weight.

For purposes of this discussion, only the corrective action in the form of an in/out movement of the air knife end will be described. A corrective action consisting of an in/out movement of the end of the air knife will be made only if that particular end is eligible for movement. Because of stability and dead-time compensation requirements, eligibility for an end to be moved is determined as follows, an end being eligible for corrective action if (1) the material influenced by the last air-knife position change has passed the coating guage; and (2) the proposed movement does not constitue a second consecutive movement of the same air knife. Also, only one knife end may be moved during any one gauge scan period (a scan period includes the data gathering scan and the retrace, during which no data is collected.) For example, if one end of the top knife is corrected at the end of a particular gauge scan, the bottom knife cannot be considered eligible for correction on that same scan. Also if an end of the top knife had made a corrective movement during the previous gauge scan period, it cannot be considered eligible for correction during the present scan period. The operation of the air-knife position control is designed to ensure an equal, or near equal, coating at similar locations near the edges of both sides (top and bottom) of the strip.

Data for the knife end position control is obtained in the following manner. As described above, incremental measured coating weight data is stored in, for example, the several cells of shift registers $SR_1$ and $SR_2$; thus these registers provide a representation of the coating weight as measured across the width of the strip. Certain groups of these cells can be considered to correspond approximately to the positions on the strip from which, in previous practice, test coupons were punched. Under the ASTM standards the (WSW) test coupons are slugs having a diameter of 2½ inches with the edge slugs or coupons being taken from a point 2 inches from each edge of the strip. In the preferred embodiment of this invention, each measuring increment has a width of ½ inch; therefore five measuring increments correspond to one ASTM coupon. The corresponding data obtained from the measurements according to the present invention would be stored in cells $T_5-T_9$ and $T_{n-9}-T_{n-5}$ of shift register $SR_1$ and in memory cells $B_5-B_9$ and $B_{n-9}-B_{n-5}$ of shift register $SR_2$. The five values in each group are averaged together in, for example, averaging circuits similar to any of the circuits $AU_1$, $AU_{12}$, or $AU_{13}$, to obtain four values corresponding to ASTM test coupons and referred to hereafter as test coupon data. These four edge coating weights are then averaged together to yield an edge coating weight set point. This edge coating weight set point is then compared with each individual test coupon data. If the difference between the edge coating weight set point and an individual test coupon data exceeds a predetermined tolerance, a control signal is applied to the appropriate knife end to effect the necessary correction to that end to bring the variant weight into line with the prescribed tolerance level.

Figure 6:
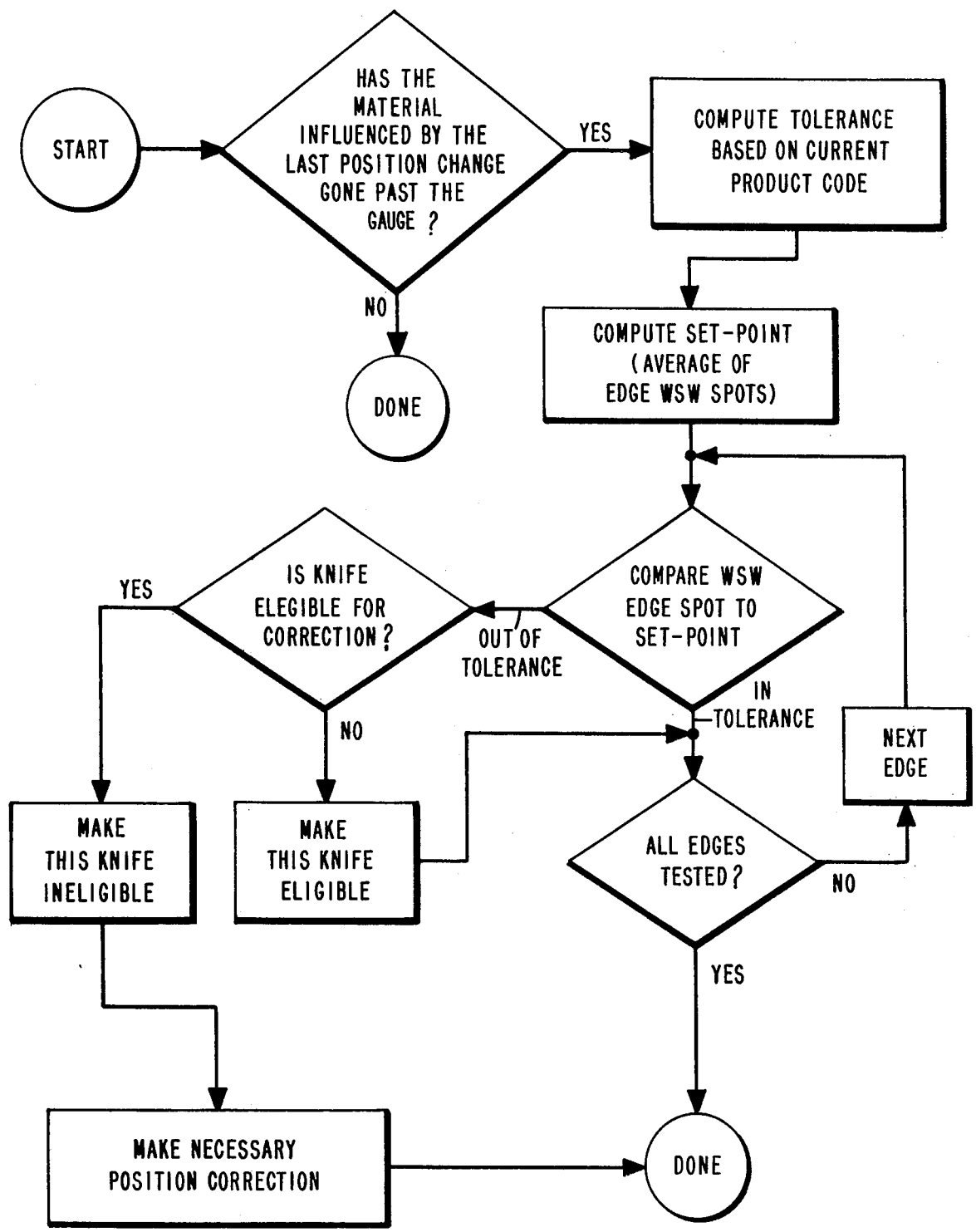
FIG. 6 is a flow chart of the air-knife position control functions performed by the digital computer.

The flow chart of FIG. 6 represents the operations performed by the P2500 computer and includes those operations based on the delay between the coating and measuring stations.

The tracking information supplied from the system disclosed and claimed in the aforementioned co-pending application Ser. No. 492,960 is supplied to an appropriate input of the P2500 computer. The tracking information includes a position check which locates a given point on the strip as it travels through and past various operating stations. For purposes of the air knife position control, information indicating that an air knife position change has been made is supplied to the tracking system and this information is moved through the tracking system at a rate which follows the strip so that the point on the strip at which the air knife position change was made can be tracked accurately from the air knife (coating control station) to the measuring gauge (measuring station). The computer is instructed to detect the passage of the last position change information through the tracking system location corresponding to the measuring gauge position.

If the physical limitations of the coating operation (e.g., heat, dust, etc.) were not present so that the measuring station could be placed immediately adjacent and contiguous with the air knife station, the position control system could effectively eliminate this step.

When the computer has determined that the point on the strip at which the knife position correction was made has passed the gauge, the computer is instructed to calculate the tolerance limits based on the current product code information (as distinguished from product code information in effect when the point on the strip now passing the measuring gauge was passing the air knife location) to determine the currently allowable test coupon weight deviations from the computed average weight. If the product code has been changed during the time the strip moves from the air knife location to the measuring gauge location, the tolerance limits will or may also have been changed. An exemplary tolerance limit value for a typical G-90 product (ASTM designation) is 0.03 to 0.05 ounces per square foot.

In some cases the product code will be changed during the coating operation due to new customer specification requirements; for instance, one customer order may be finished and product code information relating to a new customer order will be entered into the logic network. It will be seen, therefore, that the measured coating weight data stored in the cells of shift registers $SR_1$ and $SR_2$ must be modified to take into account the delay factor resulting from the distance between the air knives and the measuring gauge. This procedure is made possible by means of the tracking system disclosed in the aforementioned co-pending patent application Ser. No. 492,960 as well as by the novel system of basing current coating weights on previous coating weights as a function of the changed product code as described in the modified pressure control logic of FIG. 4.

The test coupon data is calculated, as described earlier, to obtain average weight value (designated to set point average) for the four measurement areas. Because of the rules governing air knife movement, the computer is instructed to compare each set of test coupon data with the set point average sequentially in a predetermined order. For convenience, the test coupon data corresponding to the edges of the top of the strip will be designated A and B, respectively, and for the bottom of the strip C and D, respectively. Thus, for example, the computer will first compare edge A data with the set point average; if the edge A data is determined to be within the computed tolerance limits, the computer will next test edge B data and so on through the testing of edge D data. If all of the test coupon data are found to be within the computed tolerance limits, no further corrective action is taken and the position control operation is terminated.

If the edge A data is found to be outside the computed tolerance limits, the computer will then determine whether the knife end corresponding to strip edge A is eligible for a corrective movement. If this knife end is found to be ineligible—that is, a corrective movement was made to that knife end during the immediately preceding scan period then the computer is instructed to make this end eligible for corrective movement during the next immediately succeeding scan period.

If edge A data was found to be within the computed tolerance limits, the computer is next instructed to test edge B data, (i.e., compare the edge B test coupon data with the set point average) otherwise, the computer will proceed to test edge C data. If edge B is found to be within the prescribed tolerance limits, the computer is then instructed to compare edge C data with the set point average; if the edge C data is found to be out of tolerance, the computer again determines whether the knife end corresponding to strip edge C is eligible for correction. If knife end C is found to be eligible, a control signal is generated to operate the appropriate AC motor controlling end C to produce a short movement during the next scanning period and the computer is instructed to terminate the position control operation for the rest of this current scan period. The position control operation is terminated immediately upon the making of the first corrective knife movement during a scan period or after each edge has been tested, whichever occurs first.

Also, it will be noted here that, with only slight modification, the air knife position control function described above can be used to provide a differentially coated strip (unequal top and bottom coatings) if desirable. This modification consists of applying a multiplier to the set point average (average of the four test coupon data) before comparing each test coupon data with the set point average. The multiplier used with test coupon data from that side of the strip where the greater coating is desired would be greater than the multiplier used with the test coupon data from the other side. Typical values would be 1.0 for that side of the strip where the greater coating is desired and 0.5 for the other side. The ratio of these two multipliers, of course, determines the relative coating on each side of the strip.

It will be noted here that by allowing the test coupon data on each side (top and bottom) of the strip to use a different multiplier, a prescribed percentage of the desired coating weight set point can be deposited on each side of the strip.

Although, for simplicity, the above description comprehends only test coupon data from a single scan, in practice it has been found desirable to use an average test coupon data based on the present scan plus at least one previous scan. In a typical application the number of scans averaged may range from two to four.

The disclosed control system provides a means for allowing the average coating weight of material produced in a continuous-coating line to vary between a minimum acceptable value and a maximum value sufficiently high to ensure that a minimum spot coating weight specification will always be met. It also provides a means of controlling the distribution of coating weight such as to cause the coating weights on the edges of the strip to vary within a given tolerance of each other.

It is to be understood that various modifications to the details of the preferred embodiment described herein may be made within the scope of this invention and without departing from the spirit thereof. It is intended that the scope of this invention shall be limited solely by the hereafter appended claims.

We claim:

1. In a moving strip coating process, in which a substrate strip is passed through a coating means, then past a coating control means located downstream of said coating means, said strip then passing coating-weight measuring means, a method for controlling the weight and distribution of coating material applied to said moving substrate strip, comprising the steps of:

measuring the weight of coating material on said substrate at a plurality of incremental regions across said strip and generating electrical signals representative of the measured increments;

storing said signals in a plurality of storage units corresponding in number to said plurality of incremental measuring regions;

combining said plurality of stored incremental coating weights in a first arithmetic circuit;

storing a plurality of electrical signals representing predetermined coating weight set point data in a plurality of further storage units corresponding in number to said plurality of incremental measuring regions;

combining said plurality of stored set points in a second arithmetic circuit;

comparing the combined set points and the current set point in a third arithmetic circuit and generating a first difference signal representing the difference between said combined and current set points;

storing a plurality of electrical signals representing coating correction signals in a still further plurality of storage units;

combining said plurality of stored coating correction signals in a fourth arithmetic circuit;

comparing the combined coating correction signals and the last coating correction signal in a fifth arithmetic circuit and generating a second difference signal representing the difference between said combined and last coating correction signals;

adding said combined coating-weight signal and said first and second difference signals to obtain a modified combined coating weight signal;

comparing said modified combined coating-weight signal and the current set point signal in a sixth arithmetic circuit and generating a third difference signal representing the difference between said modified combined and current set point signals;

calculating a new coating correction signal from said third difference signal; and transmitting said new coating correction signal to said coating control means to control the coating applied to said strip in accordance with said new coating correction signal.

2. The method according to claim 1, comprising the further steps of:

combining a plurality of groups of incremental coating-weight measurements to determine a minimum spot coating weight;

comparing said minimum spot coating weight and a predetermined minimum spot coating weight set point and generating a fourth difference signal representing the difference between said minimum spot and set point signals;

comparing said third and fourth difference signals and selecting the more negative signal; and transmitting said more negative signal to said coating control means.

3. In a moving strip coating process, in which the strip is passed through a coating means, and through control means, and then past a coating-weight measuring means, and in which a logic network is coupled between said measuring means and said coating control means for controlling the latter as a function of information stored into said logic network by said measuring means, a method for controlling the weight and distribution of the coating material applied to the moving substrate strip, wherein said logic network performs the steps of:

scanning said measuring means across said strip;

measuring the weight of coating material on said substrate at a plurality of incremental regions across said strip and generating electrical signals representative of the measured increments;

storing said signals in a plurality of storage units corresponding to said plurality of incremental measuring regions;

combining at least two groups of stored incremental measured coating weights representing measurements made at predetermined opposite edge portions of said strip;

averaging together at least two of said combined edge portion measurements;

comparing each combined edge portion measurement with said average of at least two combined measurements in a predetermined order and generating electrical signals representing the differences between each combined edge portion measurement, and said average of said at least two measurements;

comparing said difference signals in a predetermined order with an electrical signal representing an allowable tolerance limit and generating an electrical signal when at least one of said difference signals is outside said allowable tolerance limits;

determining whether said coating control means is eligible to make a corrective movement during the present scanning period;

generating a first control signal if said control means is determined to be eligible for corrective movement and a second control signal if said control means is determined to be ineligible for corrective movement during the present scanning period;

making said control means eligible by said second control signal for movement during a succeeding scan period if said control means is determined to be ineligible for movement;

applying said first control signal to second control means to make a corrective movement if said control means is found to be eligible for movement during the present scan period; and making said control means ineligible for corrective movement during a succeeding scan period after the last scanning period in which said control means has made a corrective movement.

4. The method according to claim 3, in which said logic network performs the further steps of:

combining each of said stored incremental coating-weight measurements;

comparing said combined measured coating weight and a predetermined coating weight set point and generating an electrical signal representing the difference therebetween;

generating a coating correction signal from said difference signal;

transmitting said coating correction signal to said coating control means; and adjusting said coating control means to change the weight of coating material on at least one portion of said substrate strip as said strip passes through said coating control means.

5. The method according to claim 4, in which said coating control means is located downstream of said means and includes fluid pressure jets for removing excess coating from said strip and means for supplying fluid under pressure to said jets, and comprising the further steps of:

transmitting said coating correction signal to said fluid supply means; and adjusting the pressure of the fluid supply to said jets in accordance with the value of said coating correction signal.

6. The method according to claim 3, in which said logic network performs the further step of:

combining said plurality of stored incremental coating weights in a first arithmetic circuit;

storing a plurality of electrical signals representing predetermined coating weight set point data in a plurality of further storage units corresponding in number to said plurality of incremental measuring regions;

combining said plurality of stored set points in a second arithmetic circuit;

comparing the combined set points and the current set point in a third arithmetic circuit and generating a first difference signal representing the difference between said combined and current set points;

storing a plurality of electrical signals representing coating correction signals in a still further plurality of storage units;

combining said plurality of stored coating correction signals in a fourth arithmetic circuit;

comparing the combined coating correction signals and the last coating correction signal in a fifth arithmetic circuit and generating a second difference signal representing the difference between said combined and last coating correction signals;

adding said combined coating-weight signal and said first and second difference signals to obtain a modified combined coating weight signal;

comparing said modified combined coating-weight signal and the current set point signal in a sixth arithmetic circuit and generating a third difference signal representing the difference between said modified combined and current set point signals;

calculating a new coating correction signal from said third difference signal; and transmitting said new coating correction signal to said fluid supply means to control the fluid pressure to said jets in accordance with said new coating correction signal.

7. The method according to claim 6, comprising the further steps of:

Combining a plurality of groups of incremental coating-weight measurements to determine a minimum spot coating weight;

comparing said minimum spot coating weight and a predetermined minimum spot coating weight set point and generating a fourth difference signal representing the difference between said minimum spot coating weight, and minimum spot set point signals;

comparing said third and fourth difference signals and selecting the more negative signal; and transmitting said more negative signal to said coating control means to control the fluid pressure to said jets.

8. In a moving strip coating process, in which the strip is passed through a coating means, and through a coating control means, and then past a coating-weight measuring means, said coating control means including flud pressure jets for removing excess coating from said strip, means for supplying fluid under pressure to said jets, and means for changing the position of said jets relative to said strip, a method for controlling the weight and distribution of the coating material applied to the moving strip, comprising the steps of:

(a) measuring the weight of coating material on said strip at a plurality of incremental measuring regions across said strip;

(b) determining the average coating weight measured in step (a) on each side of the strip;

(c) determining the average total coating weight on said strip from the measured coating weights;

(d) determining the coating weight at opposite transverse portions of said strip relative to the center of the strip;

(e) determining the minimum spot coating weight on said strip by comparing the measured coating weights of groups of incremental measuring regions across said strip to determine the group having the smallest coating weight, each group comprising at least two adjacent incremental measuring regions;

(f) adjusting the pressure of said fluid supply when at least one of the measured total coating weight and the minimum spot coating weight is deviated from a corresponding reference value to thereby adjust the amount of coating applied to said strip; and (g) adjusting the position of said fluid supply relative to said strip when the measured coating weights at the opposite transverse portions of the strip as determined in step (d) are deviated from a predetermined set point value, to thereby balance the coating applied to said strip from edge to edge and from side to side.

9. A coating control method according to claim 8, wherein said incremental measuring regions are contiguous across said strip from edge to edge.

10. A coating control method according to claim 9, wherein each said incremental measuring region is approximately ½" in width and wherein each of said groups comprises 5 incremental measuring regions.

11. A coating control method according to claim 8, wherein: step (d) further comprises:
   (h) averaging the measured coating weights of at least two adjacent incremental measuring regions at locations to the left of center on the top and bottom of said strip and to the right of center on the top and bottom of said strip; and
   wherein said predetermined set point value of step (g) is determined by:
   (i) averaging together the averaged left top and bottom and right top and bottom coating weights determined in step (h).

12. A coating control method according to claim 11, wherein said incremental measuring regions are approximately ½" in width and wherein each of said at least two adjacent incremental measuring regions in step (h) comprises 5 incremental regions.

13. A coating control method according to claim 12, wherein the center incremental region of each group averaged in step (h) is approximately 2½" from a corresponding edge of said strip.

14. A coating control method according to claim 8, wherein step (f) further comprises the steps of:
   (h) decreasing the pressure of said fluid supply when at least one of the measured total coating weight and the minimum spot coating weight is less than a corresponding reference value to thereby increase the amount of coating applied to said strip; and
   (i) increasing the pressure of said fluid supply when at least one of the measured total coating weight and the minimum spot coating is greater than a corresponding reference value to thereby reduce the amount of coating applied to said strip.

15. In a moving strip coating process, in which a strip is passed through a coating means, then past a coating control means located downstream of said coating means, said strip then passing coating-weight measuring means, a machine method for automatically controlling the application of coating material to said moving strip, comprising the steps of:
   measuring the weight of coating material on said strip at a plurality of incremental measuring regions across said strip;
   combining said plurality of measured incremental coating weights;
   combining a plurality of predetermined coating weight set point data corresponding in number to said plurality of incremental measuring regions;
   determining the difference between the combined set point data and the current set point and representing this difference by a first difference signal;
   combining a plurality of coating correction signals corresponding in number to said plurality of incremental measuring regions;
   determining the difference between the combined coating correction signals and the last coating correction signal and representing this difference by a second difference signal;
   adding said combined coating weight signal and said first and second difference signals to obtain a modified combined coating weight signal;
   determining the difference between said modified combined coating weight signal and the current set point signal and representing this difference by a third difference signal;
   calculating a new coating correction signal from said third difference signal; and
   transmitting said new coating correction signal to said coating control means to control the coating applied to said strip in accordance with said new coating control signal.

* * * * *